(12) United States Patent
Velev et al.

(10) Patent No.: US 7,453,805 B2
(45) Date of Patent: Nov. 18, 2008

(54) METHOD AND COMMUNICATION SYSTEM FOR SIGNALING INFORMATION FOR OPTIMIZING RATE CONTROL SCHEMES IN WIRELESS NETWORKS

(75) Inventors: Genadi Velev, Darmstadt (DE); Jose Luis Rey, Darmstadt (DE); Dragan Petrovic, Darmstadt (DE); Michael Zink, Darmstadt (DE); Rico Tunk, Kahl (DE)

(73) Assignee: Panasonic Corporation, Osaka (JP)

( * ) Notice: Subject to any disclaimer, the term of this patent is extended or adjusted under 35 U.S.C. 154(b) by 145 days.

(21) Appl. No.: 10/549,798

(22) PCT Filed: Mar. 21, 2003

(86) PCT No.: PCT/EP03/02980

§ 371 (c)(1),
(2), (4) Date: Jun. 2, 2006

(87) PCT Pub. No.: WO2004/084497

PCT Pub. Date: Sep. 30, 2004

(65) Prior Publication Data

US 2006/0262723 A1    Nov. 23, 2006

(51) Int. Cl.
*H04L 12/26* (2006.01)
*G06F 11/00* (2006.01)
*H04J 3/16* (2006.01)
*H04J 3/22* (2006.01)

(52) U.S. Cl. .................. 370/231; 370/234; 370/468
(58) Field of Classification Search .......... 370/229, 370/231, 234, 468
See application file for complete search history.

(56) References Cited

U.S. PATENT DOCUMENTS 7,099,954 B2 *   8/2006   Li et al. .............. 709/233
2002/0181494 A1 * 12/2002   Rhee .................. 370/465
2004/0052212 A1 *  3/2004   Baillargeon .......... 370/235

OTHER PUBLICATIONS

PCT International Search Report dated Oct. 10, 2003.
3GPP TSG Services and System Aspects: Transparent end to end packet switched streaming service (PSS) RTP usage model (Release 5) TR26.937, y1.4.0 ETSI 3GPP TR26.937, 'Online!, Feb. 2003, XP002255656, Retrieved from the Internet: <URL: www.3gpp.org> 'retrieved on Sep. 25, 2003, paragraph '6.2.1. Transmission.of.VBR. Content.Over.Constant.RA! paragraph '6.2.4.Adaptation.Capability? paragraph 6.2.5.2.3.Why.is.it.Important.to.Have.Strict.CONFO! paragraph '6.3.1.Guranteed.and.Maximum.Bitrate! paragraph '6.7.Streaming.Client!
3GPP TSG Services and System Aspects: "Transparent end to end packet switched streaming service (PSS) Protocols and Codecs (Release 5)" ETSI 3GPP TS 26.234, 'Online! Dec. 2002, XP002255657, Retrieved from the Internet: <URL: www.3gpp.org> 'retrieved on Sep. 25, 2003, paragraph '5.2.Capability.Exchange! paragraph '5.3.Session.Set.Up.and.Control! paragraph 'Annex.A.2. RTSP! paragraph 'Annex.A.4.Capability.Exchange! paragraph Annex.J.Mapping.of.SDP.Parameters.to.UMTS.QOS.PARA!

* cited by examiner

*Primary Examiner*—Kevin C. Harper
(74) *Attorney, Agent, or Firm*—Dickinson Wright, PLLC

(57) ABSTRACT

A method of exchanging signalling information for optimising a rate control scheme in a mobile network, wherein data packets are transmitted over the network from a sender to a receiver employing the rate control scheme with a sending rate which can be adapted using feedback information from the receiver, comprising the step of exchanging PDP context information between the receiver and the network, signalling PDP context information to the sender; and adapting the sending rate using the signal PDP context information. The invention further relates to a corresponding communication system as well as to a sender and a receiver for use therein.

3 Claims, 5 Drawing Sheets

Figure 1:
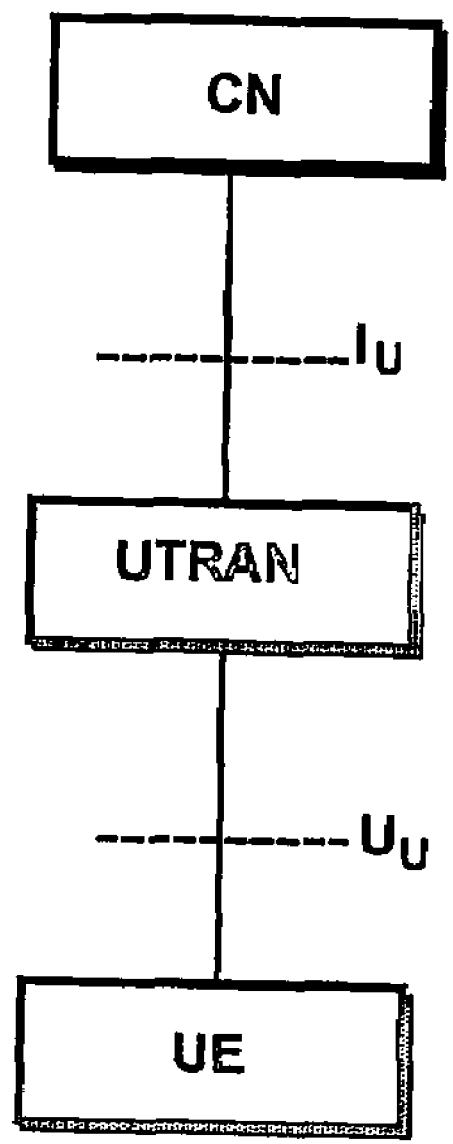

METHOD AND COMMUNICATION SYSTEM FOR SIGNALING INFORMATION FOR OPTIMIZING RATE CONTROL SCHEMES IN WIRELESS NETWORKS

This invention relates to a method and communication system for optimising the performance of rate control schemes used for sending rate adaptation of packet switched streaming (PSS) applications, where a mobile network is the last part of the end-to-end communication.

Generally, to enable the control of the streaming rate, the receiver (mobile terminal) sends feedback information to the sender (server). This information is obtained during the data transport and it is gathered in the client of the rate control scheme located in the mobile terminal. However, since the mobile terminal has link status information from the signalling protocol, this link information could be reported to the sender of the streaming application. Using the reported information, the calculation of the sending rate can be adapted to the mobile link conditions, and therefore, the quality of the streaming application would be improved.

The number of audio/video streaming applications such as Internet audio player, IP-telephony, video conferencing etc. is constantly growing and it leads to an increased percentage of non-TCP (transmission control protocol) traffic. Since these applications commonly do not implement congestion control schemes, the competition with the TCP traffic results in a highly unfair situation where the available bandwidth in the network is occupied by the PSS traffic. For this reason, rate adaptation schemes are employed in the streaming sender, which are compatible to the congestion control algorithm of TCP. These schemes are applied to the transport protocol used for streaming, e.g. UDP (user datagram protocol), and they control the sending rate in such a way that a fair bandwidth distribution between TCP and PSS traffic can be achieved. One example for such mechanism is the TCP-friendly rate control (TFRC).

TFRC is specified for unicast communication and adjusts the sending rate based on a complex equation that describes TCP throughput. The sending rate is calculated at the sender, but to gather the necessary parameters for the equation, feedback information from the receiver is needed. The used TCP throughput equation describes roughly the sending rate as a function of the loss event rate, round-trip time (RTT) and packet size. The most important information in the feedback message is the loss event rate calculated in the receiver.

A major advantage of TFRC is that it has a relatively stable sending rate (it responds slower than TCP to packet losses), but still providing sufficient responsiveness to competing traffic. TFRC should only be used when the application has a requirement for smooth throughput. Further details about the TFRC can be found in Handley, M., Floyd, S., Padhye, J. and J. Widmer "TCP Friendly Rate Control (TFRC): Protocol Specification", RFC 3448, January 2003.

The rate control schemes and in particular TFRC described above are developed for wired Internet technologies. Since the mobile networks employ recently higher bandwidth wireless technologies, the streaming applications will become more popular for the mobile user. Especially, in 3rd Generation (3G) mobile networks, e.g. UMTS, streaming services will be standard applications provided by the operator. Hence, together with streaming applications, rate control schemes need to be implemented.

The high level architecture of the Universal Mobile Telecommunication System (UMTS) is shown in FIG. 1. The network elements are functionally grouped into Core Network (CN), UMTS Terrestrial Radio Access Network (UTRAN) and User Equipment (UE). UTRAN is responsible for handling all radio-related functionality, while CN is responsible for routing calls and data connections to external networks. The interconnections of these network elements are defined by open interfaces Iu, Uu as can be seen in the Figure. It should be noted that UMTS system is modular and it is therefore possible to have several network elements of the same type.

Figure 2:
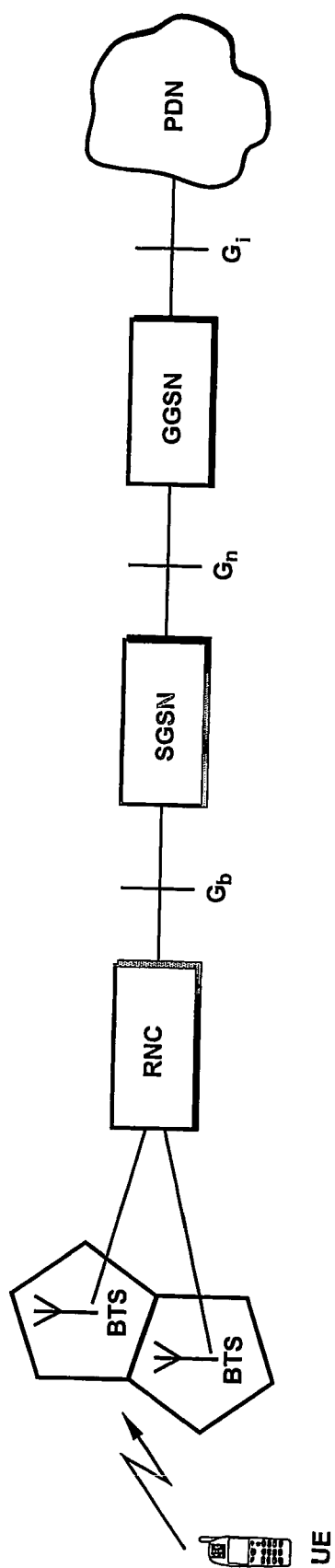

FIG. 2 shows a more detailed view of a UMTS network connected via core network elements to an external PDN (packet data network). More specifically, a mobile terminal communicates within a cellular communication system comprising a plurality of base stations BTS connected to a radio network controller (RNC) to receive and send user data and signalling data, The RNC is connected to SGSN (Serving GPRS Support Node) via interface Gb, the SGSN serves for delivery of data packets within its service area and includes routing, mobility management, authentication, etc.

Further, GGSN (Gateway GPRS Support Node) is an interface between the external PDN and the SGSN.

Figure 3:
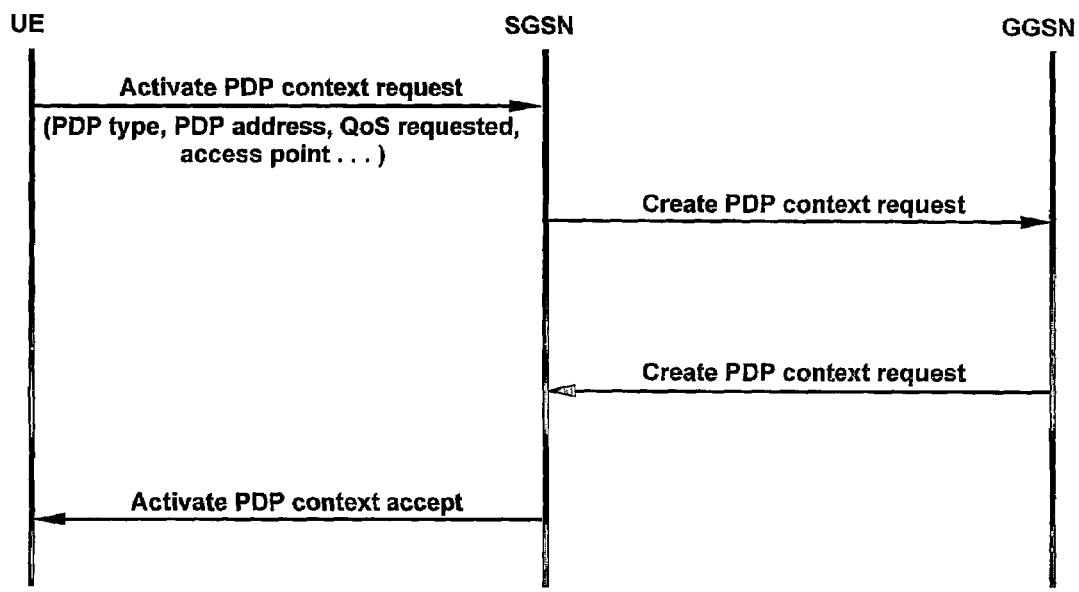

Assuming a packet switched UMTS network, for every active connection at least one Packet Data Protocol (PDP) context should exist. PDP context is established by end-to-end signalling between CN elements (Gateway GPRS Support Node—GGSN) and UE as shown in FIG. 3.

From the UE, an activate PDP context request to the SGSN is transmitted including for example the PDP type, PDP address, QoS (Quality of Service) requested, access point, etc. Subsequently, from the SGSN, a create PDP context request is sent to the GGSN resulting in a respective PDP context response. The response is transmitted from the SGSN to the UE and constitutes acceptance of the requested PDP context.

The PDP context signalling is transparent to the RAN (radio access network) and therefore belongs to the Non Access Stratum. Among the general information in the PDP context, such as "Traffic Class", it contains parameters as "maximum bit rate for downlink", "guaranteed bit rate for downlink", "maximum bit rate for uplink", "transfer delay" etc. After establishing PDP context by means of end-to-end signalling, the end-to-end QoS information is mapped to RAN specific RAB (radio access bearer) QoS attributes in the CN elements (Serving GPRS Support Node—SGSN) and signalled to RAN over Iu interface to establish an appropriate RAB. Requested attributes may be negotiated between admission control function of RAN and CN (SGSN) as described in 3GPP TSG RAN "RAB Quality of Service Negotiation over Iu", TR 25.946, V.4.0.0. When changing serving cell, a user may encounter different conditions (e.g. radio resource availability). In that case, some of RAB attributes have to be renegotiated. The re-negotiation procedure (see 3GPP TSG RAN, "RAB Quality of Service Re-negotiation over Iu", TR 25.851.V.4.0.0) is detailed in FIG. 4.

Upon reception of the RAB Assignment Request message, the RNC considers the RAB modifications agreed to by the CN. If CN has accepted the RNC proposed RAB modifications, the RNC makes those modifications and indicates to the CN that the appropriate RABs have been modified through the RAB Assignment Response message. The 'RABs Setup Or Modified' IE (Information Element) group lists the RAB IDs that have been modified. If the CN has not accepted the RNC proposed RAB modifications, and has either suggested different RAB modifications or has repeated the previously agreed upon RAB parameter values, the RNC decides if that is acceptable to it or not. If acceptable, the RNC makes the appropriate RAB modifications, if any, and lists the corresponding RAB IDs in the 'RABs Setup Or Modified' IE group of the RAB Assignment Response message it sends back to the CN. If the RAB parameter values indicated in the RAB Assignment Request message are not acceptable to the RNC, the RNC sends a RAB Assignment Response message listing the appropriate RAB IDs in the 'RABs Failed To Setup Or Modify' IE group of the message. Lastly, if CN has not accepted the RNC proposed RAB modifications, and has requested RABs to be released through the RAB Assignment Request message, the RNC releases the appropriate RABs and lists the corresponding RAB IDs in the 'RABs Released' IE group of the RAB Assignment Response message it sends to the CN.

It should be noted that negotiated parameters are signalled to the UE by Modify PDP Context Message. If the UE deems that the parameters are acceptable, it will send Modify PDP Context Accept Message.

TFRC, as a rate control scheme, probes for available bandwidth over an end-to-end communication link and it increases the sending rate until packet losses occur. After a packet loss, the sending is halved and it is increased again until the next packet loss event occurs. Therefore, packet losses and the resulting reduction of the sending rate lead to poor audio/video quality.

It is important for the quality of every packet switched streaming application that the sending/receiving rate remains constant during the time. To meet this requirement in case TFRC is used, the packet loss events resulting from the probing for available bandwidth should be avoided.

Therefore, the object of the present invention is to provide a method and communication system in which packet loss events in a packet switch streaming application are avoided while maintaining an optimal sending rate.

This object is solved by a method as set forth in claim 1 in a communication system comprising the features of claim 5.

The invention is based on the idea of adapting the rate control schemes to the conditions of the wireless channel using the signalling information already available in the terminal. In particular, for every active connection, at least one PDP context exists. Consequently, when PDP context information is exchanged between the receiver of a rate control scheme and a control plane of the network, which is signalled back to the sender and used for adapting the sending rate, the sending rate of the rate control mechanism is limited in such a way that packet losses would be avoided.

The optimisation is achieved by information exchange between Non Access Stratum of mobile networks and rate control scheme, in particular, by information exchange between PDP context and rate control schemes in the mobile terminal. Providing this information to the rate control scheme in sender, the sending rate can be adapted better to the changing conditions over the mobile channel, and therefore, the quality of the streaming application could be improved.

To meet the requirements for low pre-decoder buffer, both packet delay as well as the packet delay jitter should be kept possibly low. Applying sending bit rate limitation, packet delay and delay jitter could be reduced, and thus, the demands of pre-decoder buffering at the sender are lowered.

Figure 4:
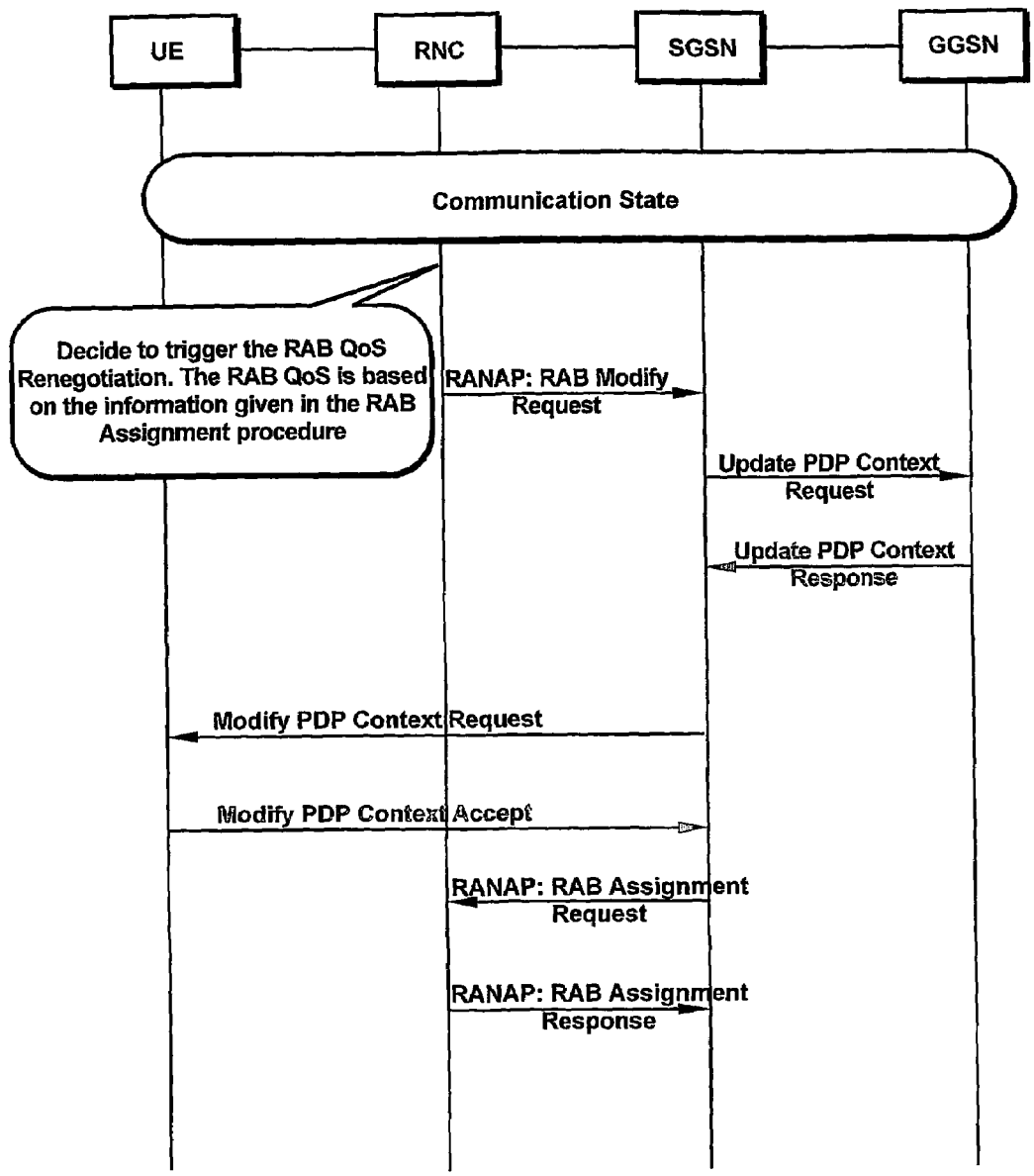
Figure 5:
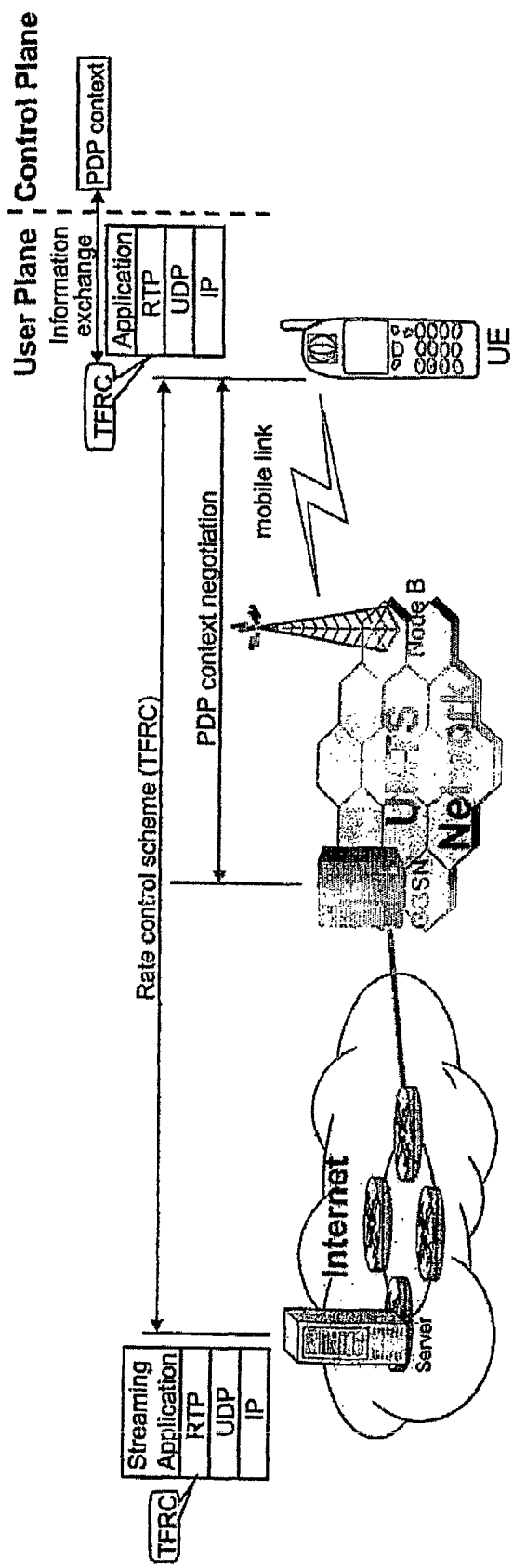

The invention will be described in the following in further detail with reference to the accompanying drawings, which show:

FIG. 1 a high level UMTS architecture;

FIG. 2 a diagram illustrating the communication between a mobile terminal and an external PDN;

FIG. 3 an example for a PDP context procedure between the mobile terminal and the GGSN;

FIG. 4 an example for a re-negotiation procedure between the mobile terminal and CN elements; and FIG. 5 illustrates a communication system according to the present invention.

In FIG. 5, UMTS network is schematically shown including a cellular system served by one or more base stations designated node B. The GGSN provides the connection via an external PDN, i.e. the internet to a streaming application located at a server. The streaming application uses the following protocol stack RTP/UDP/IP for streaming data to the mobile terminal UE.

The mobile terminal UE has on the one hand, a mobile link to node B to receive packet data and providing feedback on the received packets. Further, a PDP context negotiation can be established directly with the core network, i.e. GGSN. A TFRC rate control scheme is assumed, where the sending rate is calculated in the sender using feedback information from the UE receiver (TFRC client). According to the conventional operation, particularly, during the slow start phase the sending rate, X, is approximately doubled each round-trip time until a loss occurs and it is calculated according to equation (1), where X_recv is the receiving rate at the TFRC client, s is the packet size and R is the round-trip time.

$$X=\max\{\min\{2*X, 2*X\_recv\}, s/R\} \quad (1)$$

If the last hop of the end-to-end connection is a mobile link, e.g. part of UMTS network, it is assumed that the mobile link is the bottleneck link determining the bandwidth limitation. During the setup of the connection through UMTS network, PDP context information is exchanged between mobile terminal and GGSN, and thus, the mobile terminal has knowledge of the bottleneck parameters.

An interface is defined in the mobile terminal between TFRC client (user plane) and the control plane in the receiver for transmitting PDP context information. After receiving the first data packet, the TFRC client requires information about the variable service parameter "guaranteed bit rate for downlink" from the PDP context information using the defined interface. The value of this parameter is signalled back to the TFRC sender via RTSP (Real Time Stream Protocol). In the sender, equation (2) for calculating the bit rate is employed, where X_max is a new parameter identifying the limitation of sending bit rate and corresponding to the signalled parameter "guaranteed bit rate for downlink".

$$X=\min\{\max\{\min\{2*X, 2*X\_recv\}, s/R\}, X\_max\} \quad (2)$$

Every time a new PDP context is negotiated, and the "guaranteed bit rate for downlink" parameter is changed, it should be signalled to the TFRC client, so that the necessary update in the sender can be provided.

As an alternative parameter instead of "guaranteed bit rate" also "maximum bit rate for downlink" could be employed for limiting the sending rate.

The modification of the TFRC algorithm leads to limitation of the maximum allowed sending rate that would decrease the likelihood of packet loss events and therefore audio/video quality would be improved.

The invention claimed is:

1. A method of exchanging signaling information for optimizing a rate control scheme in a mobile Universal Mobile Telecommunication System (UMTS) communication network, wherein data packets are transmitted over the network using Transmission Control Protocol (TCP) from an external packet switched streaming sender to a mobile terminal employing TCP Friendly Rate Control (TFRC) as the rate control scheme with a sending rate which can be adapted using feedback information from the mobile terminal, the method comprising:

exchanging Packet Data Protocol (PDP) context information including a negotiable service parameter indicating the maximum or guaranteed bit rate for downlink between the mobile terminal and a gateway support node of the network;

receiving at a control plane of the mobile terminal the PDP context information;

transmitting the received PDP context information to the packet switched streaming sender using a real time stream protocol; and adapting the sending rate at the packet switched streaming sender using the received PDP context information according to $X_{next}=\min \{\max \{\min \{2*X\_recv\}, s/R\}, X\_max\}$, where $X_{next}$ is the next sending rate, X is the current sending rate, X_recv is the receiving rate at the TFRC mobile terminal, s is the packet size, R is the round trip time and X_max is the maximum or guaranteed bit rate for downlink.

2. A communication system for exchanging signaling information for optimizing a rate control scheme in a mobile Universal Mobile Telecommunication System (UMTS) communication network, the system comprising:

an external packet switched streaming sender for transmitting data packets over the network using Transmission Control Protocol (TCP) to a mobile terminal employing TCP Friendly Rate Control (TFRC) as the rate control scheme with a sending rate which can be adapted using feedback information from the mobile terminal, wherein:

the mobile terminal is adapted to exchange Packet Data Protocol (PDP) context information including a negotiable service parameter indicating the maximum or guaranteed bit rate for downlink with a gateway support node of the network, the mobile terminal is furthermore adapted to receive at its control plane the PDP context information and transmit the PDP context information to the packet switched streaming sender using a real time stream protocol, and the packet switched streaming sender is adapted to adjust the sending rate using the received PDP context information according to $X_{next}=\min \{\max \{\min \{2*X\_recv\}, s/R\}, X\_max\}$, where $X_{next}$ is the next sending rate, X is the current sending rate, X_recv is the receiving rate at the TFRC mobile terminal, s is the packet size, R is the round trip time and X_max is the maximum or guaranteed bit rate for downlink.

3. The system of claim 2, wherein the UMTS network comprises a gateway GPRS support node that communicates information between the mobile UMTS network and an external packet data network.

* * * * *